United States Patent Office
3,449,383
Patented June 10, 1969

3,449,383
17-OXYGENATED ESTRA-1,3,5(10)-TRIENE-3,11β,16-TRIOLS, ETHERS AND ESTERS THEREOF
John S. Baran, Morton Grove, Ill., assignor to G. D. Searle & Co., Chicago, Ill., a corporation of Delaware
No Drawing. Filed Feb. 16, 1967, Ser. No. 616,452
Int. Cl. C07c 169/00, 171/00
U.S. Cl. 260—397.5
6 Claims

ABSTRACT OF THE DISCLOSURE 17-oxygenated estra-1,3,5(10)-triene - 3,11β,16 - triols, ethers and esters thereof useful as anti-inflammatory, estrogenic and hypocholesterolemic agents and manufactured by oxidation with lead tetraacetate of the corresponding Δ¹⁶-enol esters optionally followed by reduction and/or hydrolysis and/or etherification.

---

This invention is concerned with novel steroidal chemical compounds characterized by oygenated functions at the 11 and 16 positions and, more particularly, with 17-oxygenated estra-1,3,5(10)-triene-3,11β-16-triols and the ethers and esters thereof represented by the following structural formula

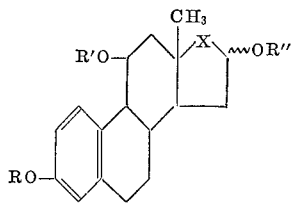

In that structural representation R can be hydrogen, a lower alkyl or lower alkanoyl radical, R' and R" can be hydrogen or a lower alkanoyl radical, X is a carbonyl or β-hydroxymethylene group and the wavy line indicates the optional α or β stereochemical configuration.

The lower alkyl radicals encompassed by the R term are typified by methyl, ethyl, propyl, butyl, pentyl, hexyl, heptyl and the branched-chain groups isomeric therewith.

Examples of the lower alkanoyl radicals within the scope of the R, R' and R" terms are formyl, acetyl, propionyl, butyryl, valeryl, caproyl, heptanoyl and the branched-chain isomers thereof.

Manufacture of the compounds of the present invention is conveniently achieved by processes involving the utilization of a 3,11β-dihydroxyestra-1,3,5(10)-trien-17-one 17-ketal as the starting material. Removal of the ketal function of 3,11β-dihydroxyestra-1,3,5(10)-trien-17-one 17-ethylene ketal, for example, suitably by reaction with hydrochloric acid in methanol, affords 3,11β-dihydroxyestra-1,3,5(10)-trien-17-one. Acylation of the 3- and 11-hydroxy functions is effected by contacting that substance with a lower alkanoic acid anhydride or halide, preferably in the presence of a suitable acid acceptor such as pyridine or triethylamine. Contact of that diol with acetic anhydride and pyridine thus affords 3,11β-diacetoxyestra-1,3,5(10)-trien-17-one. Conversion of those diesters to the corresponding 17-enol ester is effected by reaction with the appropriate isopropenyl ester. 3,11β-diacetoxyestra-1,3,5(10)-trien-17-one is thus heated with isopropenyl acetate in the presence of p-toluenesulfonic acid to afford estra-1,3,5(10),16-tetraene-3,11β,17-triol 3,11,17-triacetate. Oxidation of those enol esters with lead tetraacetate results in the corresponding 16,17-ketol acetates. The aforementioned estra-1,3,5(10),16-tetraene-3,11β,17-triol 3,11,17-triacetate is thus allowed to react at room temperature with lead tetraacetate in acetic acid, resulting in 3,11β,16β-triacetoxyestra-1,3,5(10)-trien-17-one and 3,11β,16α-triacetoxyestra-,3,5(10)-trien-17-one. Reduction of those triacyloxy ketones with a metallic reducing agent affords the corresponding triacyloxy alcohols. Reaction of 3,11β,16β - triacetoxyestra - 1,3,5(10)-trien-17-one with lithium tri-(tertiary butoxy) aluminum hydride in tetrahydrofuran thus results in estra-1,3,5(10)-triene-3,11β,16β,17β-tetrol 3,11,16-triacetate. Hydrolysis of those esters with an alkaline reagent, suitably potassium hydroxide in aqueous methanol, produces estra-1,3,5(10)-triene-3,11β,16β,17β-tetrol. When that tetrol is contacted with an etherifying reagent such as an alkyl halide or sulfate, preferably in the presence of a suitable acid acceptor, the 3-monoethers are obtained. When estra-1,3,5(10)-triene-3,11β,16β,17β-tetrol is heated with methyl iodide and potassium carbonate in methanol, estra-1,3,5(10)-triene-3,11β,16β,17β-tetrol 3-methyl ether is thus produced.

The compounds of this invention are useful as a result of their valuable pharmacological properties. They are anti-inflammatory agents, for example, as is evidenced by their ability to reduce the edema formation associated with inflammatory states. In addition, they are hormonal agents as is apparent from their estrogenic activity. They are, furthermore, hypocholesterolemic agents in view of their ability to reduce serum cholesterol levels.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples, temperatures are given in degrees centigrade (° C.). Quantities of materials are expressed in parts by weight except where otherwise noted.

EXAMPLE 1

To a solution of 10 parts of 3,11β-dihydroxyestra-1,3,5(10)-trien-17-one 17-ethylene ketal in hot methanol is added 50 parts by volume of dilute hydrochloric acid, and the resulting reaction mixture is allowed to stand for about 15 minutes, then is stripped of methanol by distillation under reduced pressure. The residual mixture is diluted with approximately 100 parts of water, and the resulting precipitated product is collected by filtration and dried to afford 3,11β-dihydroxyestra-1,3,5(10)-trien-17-one.

A solution containing 9 parts of 3,11β-dihydroxyestra-1,3,5(10)-trien-17-one, 25 parts of acetic anhydried and 50 parts of pyridine is allowed to stand at room temperature for about 16 hours, then is warmed at approximately 60° for about 2 hours, cooled and diluted gradually with approximately 200 parts of ice, during which time the mixture is stirred. The mixture is further diluted with approximately 500 parts of water, and the resulting precipitate is collected by filtration, washed on the filter with water, then died in air to yield 3,11β-diacetoxyestra-1,3,5(10)-trien-17-one, melting at about 145–160°.

EXAMPLE 2

A mixture containing 10 parts of 3,11β-diacetoxyestra-1,3,5(10)-trien-17-one, 920 parts of isopropenyl acetate and 0.5 part of p-toluenesulfonic acid monohydrate is slowly distilled over a period of about 8 hours, following which time an additional 460 parts of isopropenyl acetate is added and distillation is continued until approximately 400 parts by volume of distillate has been collected. The reaction mixture is neutralized by the addition of approximately 1 part of pyridine, then is distilled to dryness. The resulting residue is extracted with benzene, and the benzene solution is separated, washed several times with water, dried over anhydrous magnesium sulfate and concentrated to dryness under reduced pressure. Chromatography of the resulting residue on silica gel followed by elution with 5% ethyl acetate in benzene and recrystallization of the eluted fraction from ether-hexane affords estra - 1,3,5(10),16-tetraene-3,11β,17-triol 3,11,17-triacetate, melting at about 180–181°.

EXAMPLE 3

A mixture containing 7 parts of estra-1,3,5(10),16-tetraene-3,11β,17-triol 3,11,17-triacetate, 8.5 parts of lead tetraacetate and 52.5 parts of acetic acid is stirred at room temperature for about 2 hours; an additional 2 parts of lead tetraacetate is added and stirring is continued for approximately 30 minutes longer. Chloroform is then added and the resulting organic solution is washed successively with aqueous sodium bisulfite, water and aqueous sodium bicarbonate, then dried over anhydrous magnesium sulfate and distilled to dryness under reduced pressure. Trituration of the resulting residue with ether and hexane affords crystals melting at about 180–189°. Recrystallization of that crude product from ether-hexane affords pure 3,11β,16β-triacetoxyestra-1,3,5(10)-trien-17-one, melting at about 203–207° and characterized further by the following structural formula

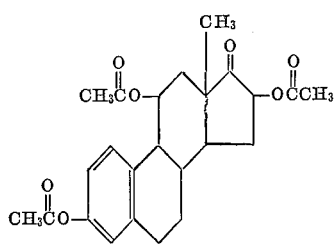

EXAMPLE 4

The ether-hexane mother liquors from the recrystallization described in Example 3 are chromatographed on a silica gel column, then eluted with 10% ethyl acetate in benzene. Fractional crystallization from methanol-methylene chloride of the eluted fraction affords 3,11β,16α-triacetoxyestra-1,3,5(10)-trien-17-one.

EXAMPLE 5

The substitution of an equivalent quantity of propionic anhydride in the procedure of Example 1 results in 3,11β-dipropionoxyestra-1,3,5(10)-trien-17-one.

When equivalent quantities of 3,11β-dipropionoxyestra-1,3,5(10)-trien-17-one and isopropenyl propionate are allowed to react according to the procedure described in Example 2, there is produced estra-1,3,5(10),16-tetraene-3,11β,17-triol 3,11,17-tripropionate.

The substitution of an equivalent quantity of estra-1,3,5(10),16-tetraene-3,11β,17-triol 3,11,17-tripropionate in the procedure of Example 3 results in 16β-acetoxy-3,11β-dipropionoxyestra-1,3,5(10)-trien-17-one and 16α-acetoxy-3,11β-dipropionoxyestra-1,3,5(10)-trien-17-one.

EXAMPLE 6

A mixture containing 1 part of 3,11β,16β-triacetoxyestra-1,3,5(10)-trien-17-one, 2 parts of lithium tri-(tertiary butoxy) aluminum hydride and 45 parts of tetrahydrofuran is stirred at room temperature for about 2 hours, then is poured carefully with stirring into a mixture containing 100 parts of ice and water and 15.8 parts of acetic acid. The resulting aqueous mixture is extracted with chloroform, and the chloroform extract is washed several times with water, then with dilute aqueous sodium bicarbonate, dried over anhydrous magnesium sulfate and distilled to dryness under reduced pressure. The residual solid is dissolved in ether, and the organic solvent is removed by evaporation on the steam bath to afford a crystalline residue of estra-1,3,5(10)-triene-3,11β,16β,16β-tetrol 3,11,16-triacetate, melting at about 113–114°. It exhibits infrared absorption maxima at about 2.75, 3.30, 3.40, 5.75, 6.19 and 6.29 microns and is represented by the following structural formula

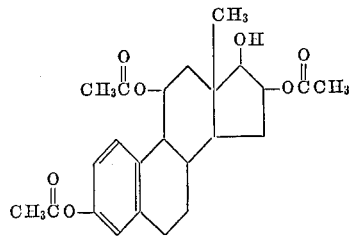

EXAMPLE 7

To a solution of 1 part of estra - 1,3,5(10) - triene-3,11β,16β,17β - tetrol 3,11,16 - triacetate in 16 parts of methanol is added a warm solution of 4 parts of potassium hydroxide in 20 parts of methanol containing 10 parts of water. The resulting reaction mixture is heated on the steam bath, under nitrogen, while a stream of nitrogen is passed through the solution. Approximately 25 parts of water is added, and heating is continued for approximately 2 hours. Methanol is added occasionally during that period in order to maintain homogeneity. At the end of the heating period the solution is concentrated under reduced pressure, then is acidified to pH 1–2 by the addition of dilute hydrochloric acid. The precipitate which forms is collected by filtration, washed with water and dried in air to afford the crude product. Purification by recrystallization from aqueous methanol yields pure estra - 1,3,5(10) - triene - 3,11β,16β,17β-tetrol, melting at about 279–280° and characterized by infrared absorption maxima, in a potassium bromide disc, at about 2.90, 3.07, 3.43, 6.18 and 6.32 microns. This compound is represented by the following structural formula

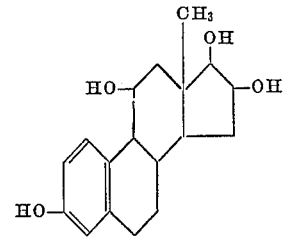

EXAMPLE 8

A mixture containing 2.25 parts of estra - 1,3,5(10)-triene - 3,11β,16β,17β - tetrol, 22.8 parts of methyl iodide, 9 parts of potassium carbonate and 40 parts of methanol is heated at the reflux temperature for about 3 hours, then is cooled and diluted with water. Distillation of that mixture in order to remove methanol results in precipitation of the crude product, which is isolated by filtration. Recrystallization of that material from acetone-hexane containing a trace of pyridine affords colorless crystals of estra - 1,3,5(10) - triene - 3,11β,16β,17β-tetrol 3-methyl ether, melting at about 172°. It is represented by the following structural formula

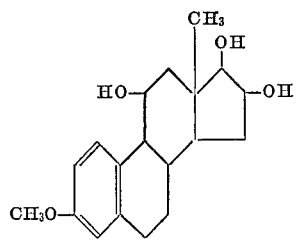

EXAMPLE 9

By substituting an equivalent quantity of ethyl iodide and otherwise proceeding according to the processes described in Example 8, there is produced estra - 1,3,5(10)-triene - 3,11β,16β,17β - tetrol 3 - ethyl ether.

What is claimed is:
1. A compound of the formula

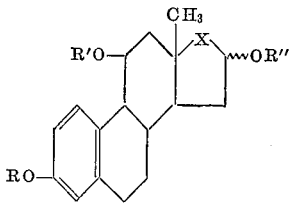

wherein R is selected from the group consisting of hydrogen, a lower alkyl and a lower alkanoyl radical, R' and R" are members of the class consisting of hydrogen and a lower alkanoyl radical and X is a β-hydroxymethylene radical.

2. As in claim 1, a compound of the formula

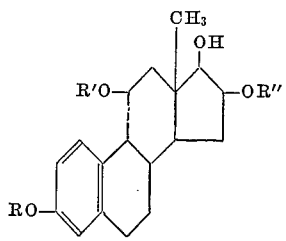

wherein R, R' and R" are lower alkanoyl radicals.

3. As in claim 1, a compound of the formula

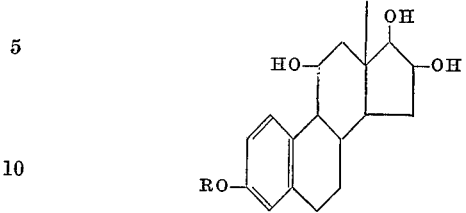

wherein R is a lower alkyl radical.

4. As in claim 1, the compound which is 3,11β,16β-triacetoxyestra-1,3,5(10)-trien-17-one.

5. As in claim 1, the compound which is estra-1,3,-5(10)-triene-3,11β,16β,17β-tetrol.

6. As in claim 1, the compound which is estra-1,3,-5(10)-triene-3,11β,16β,17β-tetrol 3-methyl ether.

References Cited

UNITED STATES PATENTS

| | | | |
|---|---|---|---|
| 2,885,413 | 5/1959 | Hogg et al. | 260—397.45 |
| 3,194,832 | 7/1965 | Reimann et al. | 260—488 |

FOREIGN PATENTS 4,339M  8/1966  France.

ELBERT L. ROBERTS, *Primary Examiner.*

U.S. Cl. X.R.

260—397.45